United States Patent [19]

Vansteelant

[11] 4,161,097
[45] Jul. 17, 1979

[54] KNOTTER WITH IMPROVED BILLHOOK AND ACTUATION MECHANISM

[75] Inventor: Marc G. Vansteelant, Zedelgem, Belgium

[73] Assignee: Sperry Rand Corporation, New Holland, Pa.

[21] Appl. No.: 916,371

[22] Filed: Jun. 16, 1978

[30] Foreign Application Priority Data

Jun. 21, 1977 [GB] United Kingdom ............... 25939/77

[51] Int. Cl.² .......................................... A01D 39/00
[52] U.S. Cl. .......................................... 56/343; 289/2
[58] Field of Search ................. 56/343, 138, 139, 142, 56/145, 147, 150-152; 289/2, 9, 11

[56] References Cited

U.S. PATENT DOCUMENTS

| | | | |
|---|---|---|---|
| 3,101,963 | 8/1963 | Sullivan et al. | 289/2 |
| 3,410,589 | 11/1968 | Nolt | 289/11 |
| 3,416,824 | 12/1968 | Nolt et al. | 289/2 |
| 3,601,433 | 8/1971 | Mercier et al. | 289/2 |
| 4,106,267 | 8/1978 | White | 56/341 |

Primary Examiner—Russell R. Kinsey
Assistant Examiner—Paul J. Hirsch
Attorney, Agent, or Firm—John B. Mitchell; Frank A. Seemar; Ralph D'Alessandro

[57] ABSTRACT

A knotter mechanism, primarily for use in crop baling machines, with an improved billhook and actuation means therefor is disclosed. The billhook is rotatably mounted on the knotter frame and includes a fixed jaw having an elongate shaft and a movable jaw with an integral heel portion is pivotally fixed to the fixed jaw whereby pivotable of the moveable jaw opens and closes the billhook. An actuation means in the form of a rotatable roller is mounted on the knotter frame adjacent the billhook on an axis of rotation perpendicular to the longitudinal axis of the fixed jaw shaft. As the billhook rotates, the heel portion of the moveable jaw periodically engages the roller, resulting in selective opening and closing of the billhook.

4 Claims, 29 Drawing Figures

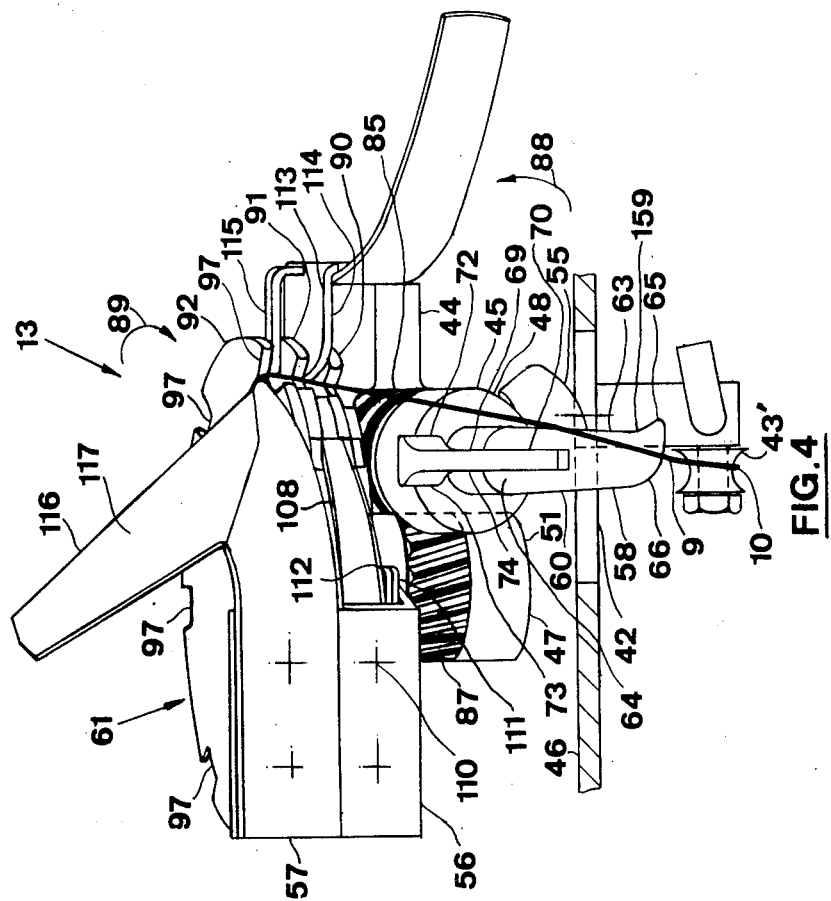

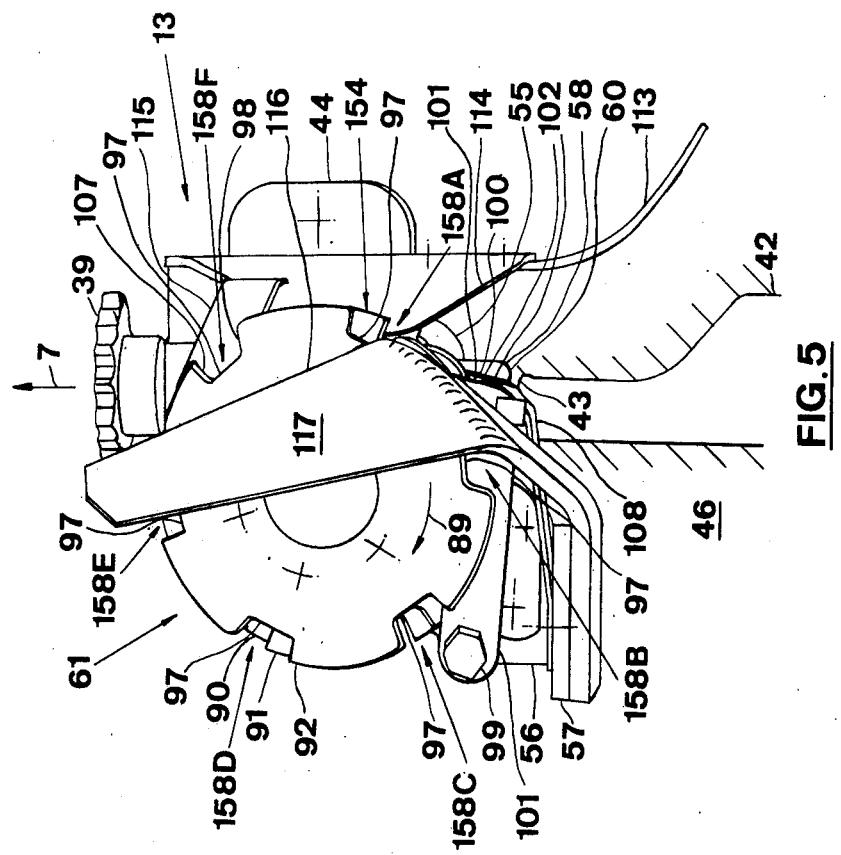

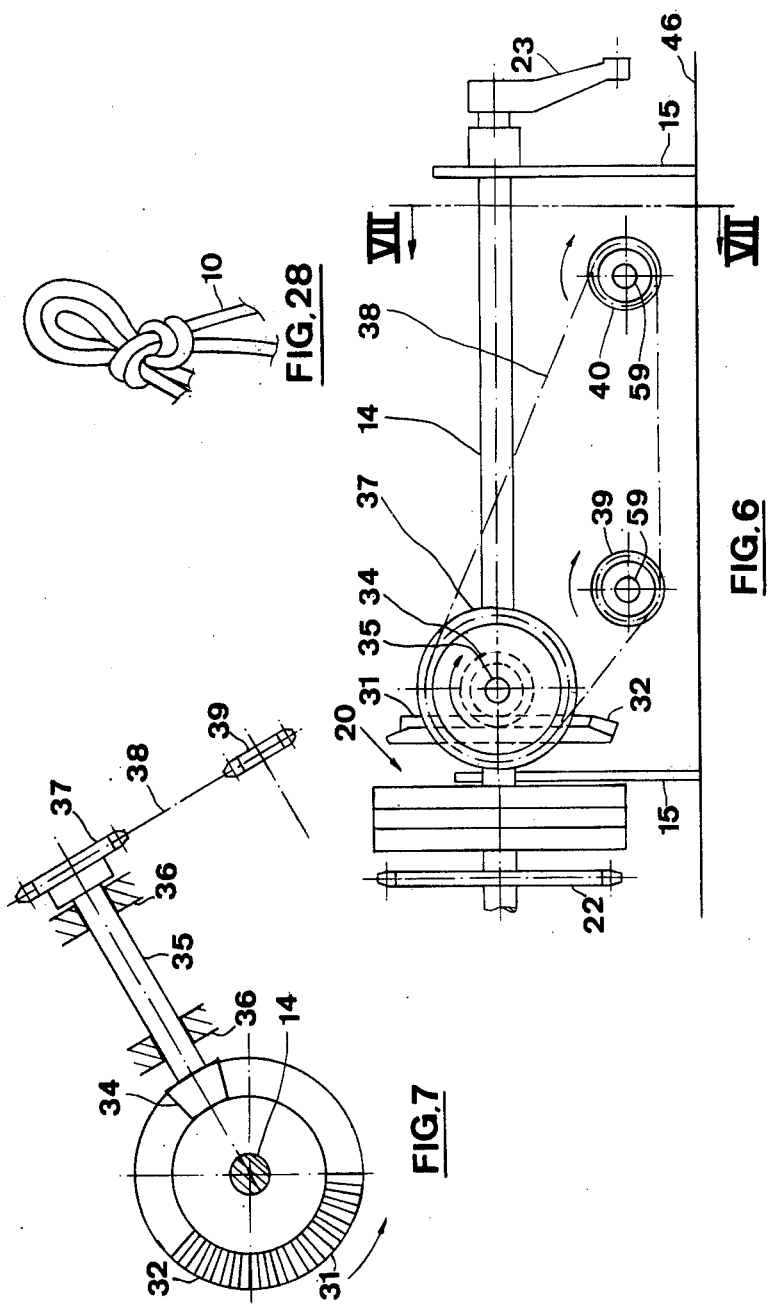

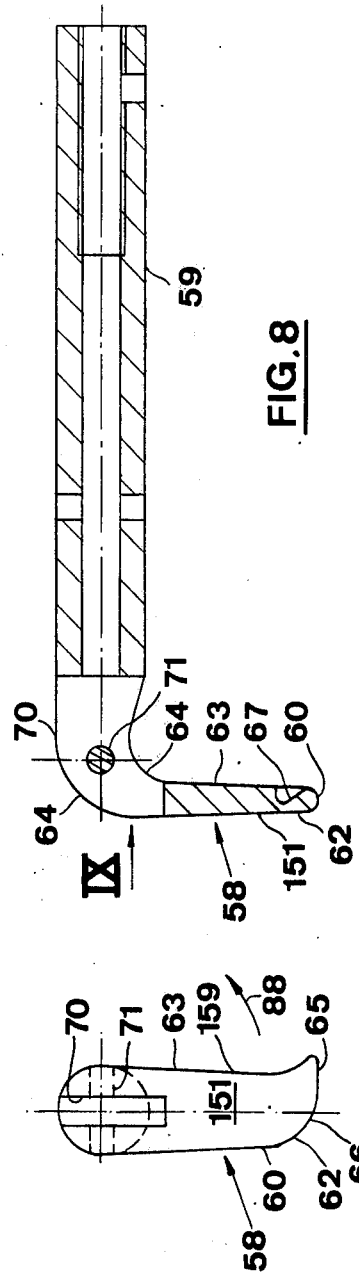
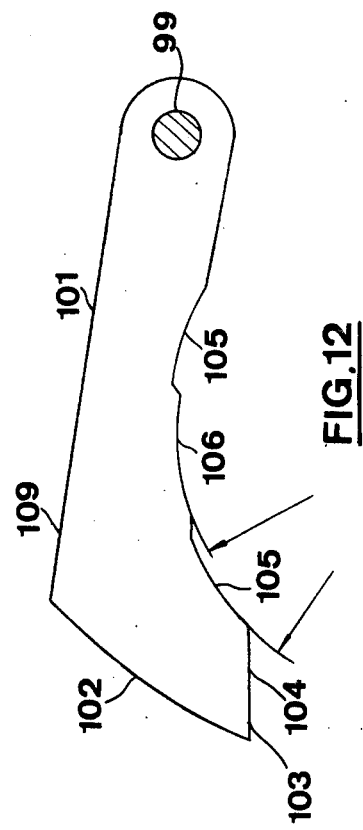

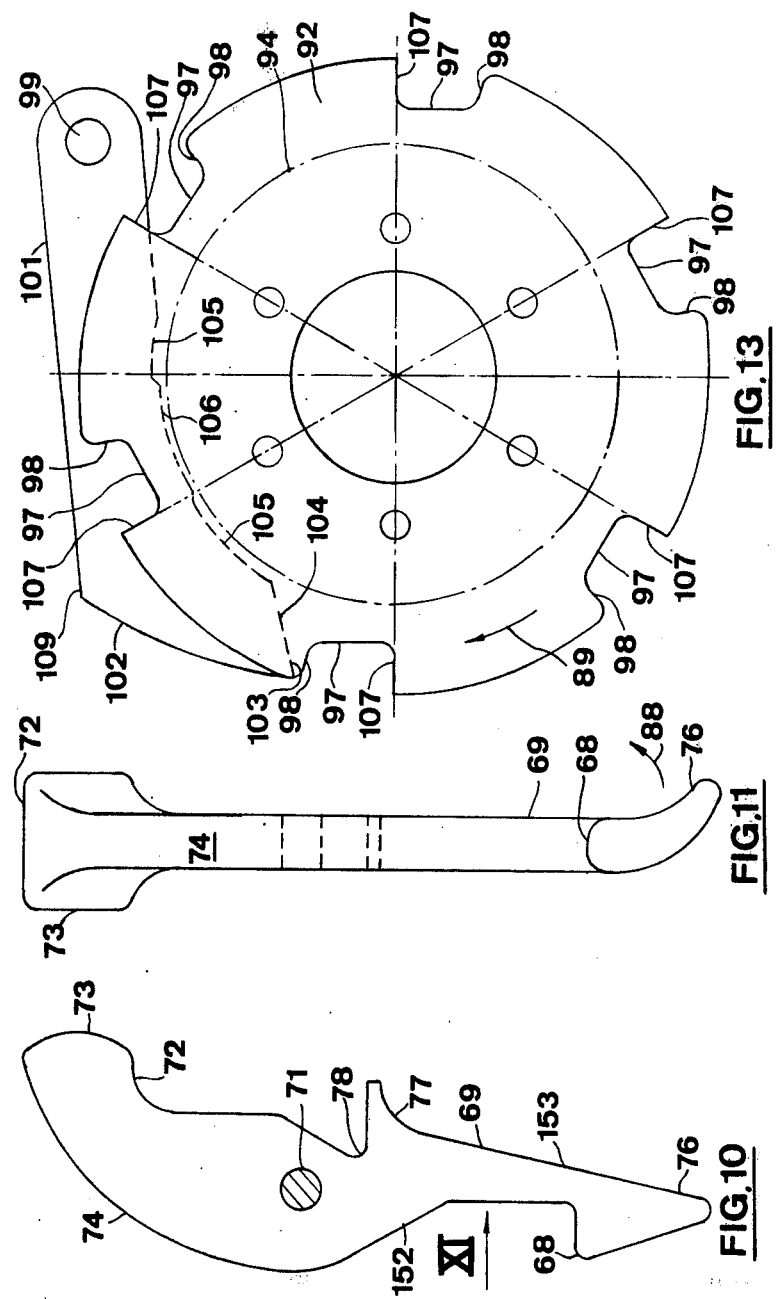

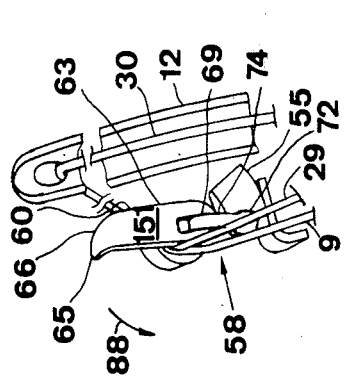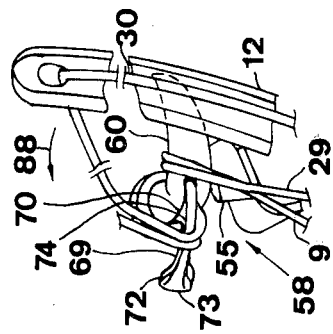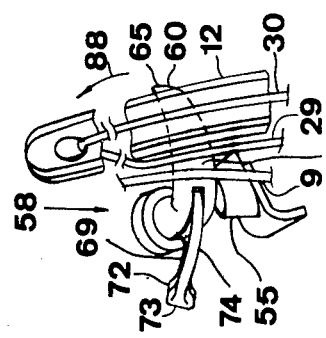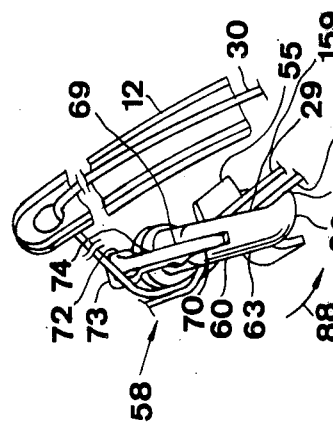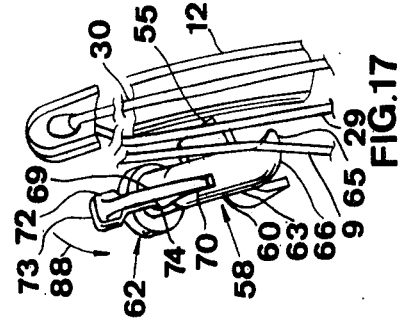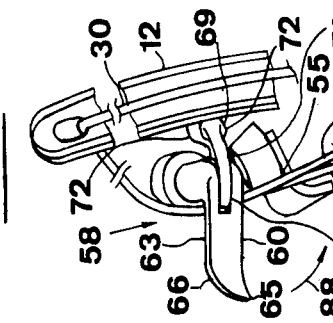

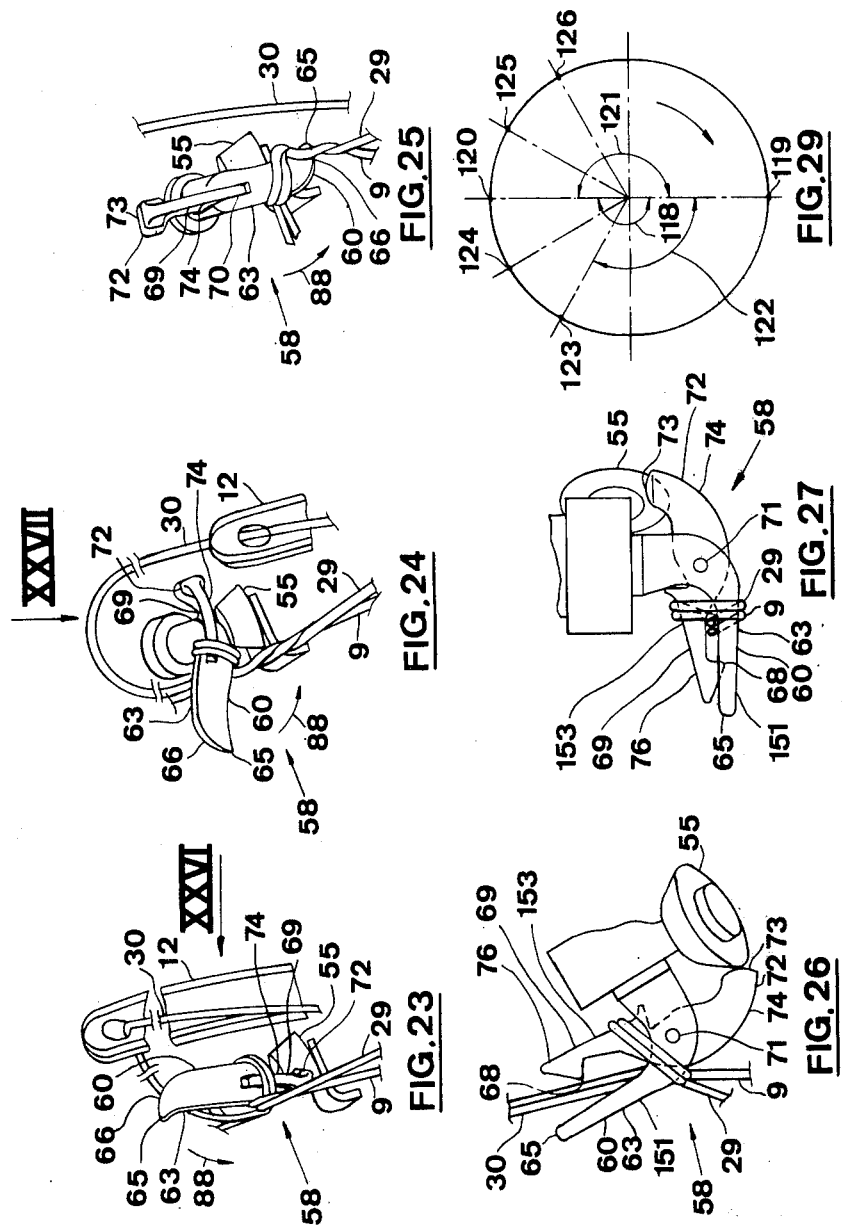

KNOTTER WITH IMPROVED BILLHOOK AND ACTUATION MECHANISM

BACKGROUND OF THE INVENTION

This invention relates generally to knot tying mechanisms, and specifically to an improved billhook and actuation means therefor.

In conventional hay balers, hay, straw and similar crop material that has been previously cut, windrowed or swathed is picked up from the ground by a pick-up unit and fed in successive batches or charges into an elongated bale chamber in timed sequence with a reciprocating plunger. The plunger compresses the material into bales and, at the same time, gradually advances the bales towards the outlet of the bale chamber. As the bales reach a predetermined length as determined by a metering device, a knotter is actuated which wraps cord, twine or other similar tie material around the bale and secures the ends of the material together.

In a typical baler a knotter is mounted on the bale chamber above a slot therein, the knotter comprising a twine holder from which twine extends to encircle a bale. During the baling operation, the leading strand of twine is held by the twine holder and extends forwardly across a twine retainer finger and a billhook and then in front of the bale. The twine retainer finger supports the strand so that it does not bear forcefully against the billhook. A needle is involved in completing the encirclement of twine around the bale and when advancing, the needle lays a trailing strand across the twine retainer finger, billhook and twine holder. A twine finger captures these strands of twine and positively positions the strands against the heel of the billhook. Thus, there are presented in a certain zone a pair of twine portions of strands lying along side of each other and these portions are twisted into a bight by the billhook and a portion thereof is pulled through the bight to form a double overhand knot. On completion of the operation of the knotter, the twine finger returns to the initial position. Removal of the tied knot from the billhook involves mechanical stripping by a movable member which normally embodies a knife operable to cut the twine from the twine supply so that the tied bale is complete in itself. The tying mechanism thus includes several components working in a precisely timed relationship so that theoretically the mechanism ties one knot for each bale and prepares the twine for the succeeding bale.

A knotter is inherently a relatively complicated structure, and the precisely timed operation thereof suffers at times from faulty operation. This may be due to the vibrations of the baler, the tension in the twine and the jarring of the baler as it moves through the field. The crop may be tough or resilient causing the strands of twine to jump about. Variations in the baling twine also affect the knotting operation. Balers are operated outside and often parked in the field, whereby the knotter is exposed to all weather conditions. Also, the knotter is subjected to dirt, crop and debris resulting in abrasion and interference of operation.

At present, balers are capable of reasonably efficient operation at speeds up to a maximum of approximately eighty to ninety strokes per minute of baling plunger. One reason for this limitation on the operation speed is that the presently available knotters cannot perform the complex tying operation at faster speeds, and the latter operation must be carried out in timed sequence with the strokes of the baling plunger. Restraint on faster knotter operation is imposed by various cam and cam followers, complicated knotter drive means, and other oscillatory parts employed in a typical knotter which give rise to relatively high inertia forces.

In some known knotters the billhook may comprise two jaws with one being movable relative to the other to effect opening and closing of the jaws. The movable jaw may be provided at its heel with a roller which acts as a cam follower and engages a cam track having a profile appropriate to the required action of the jaws. Invariably, the profile of the cam track is relatively complex, and, therefore, expensive. Also, the track has to be accommodated within the knotter mechanism and the size and shape is not always easy to tolerate in this respect. The provision of a roller on a movable jaw of the billhook gives rise to another problem in that the movable jaw serves as a twine guide in the knotting sequence and the roller, in conjunction with the associated spindle tends to create a twine trap which can lead to a knotter malfunction.

SUMMARY OF THE INVENTION

It is an object of the present invention to overcome or to attenuate one or more of the foregoing disadvantages. More particularly, it is an object of the present invention to provide a knotter mechanism having an improved billhook and actuation means therefor which is simple and reliable and which requires only a minimum of attention once it has left the factory.

According to the present invention, a knotter comprises a twine holder operable to hold, during a knot-tying operation, a primary portion and a secondary portion of twine in which the knot is to be tied, and a rotary billhook rotatable about an axis to which it is inclined, the billhook comprising two jaws, one of which is movable relative to the other about a pivot disposed intermediate its ends, and a heel portion formed integrally with the movable jaw and in use being cooperable with rotary actuation means to effect opening of the jaws during part of the rotary movement of the billhook.

The heel of the movable jaw of the billhook may act as a cam follower and cooperate with rotary actuation means rotatably mounted on a stationary spindle and located in the path of the heel when a billhook is rotated. The rotary actuation means may be in the form of a roller which may have a partially, at least, spherical working surface. With this arrangement, the roller cannot act as a twine trap and it is an easy component to manufacture even when provided with a partially spherical working surface. Also, since the roller is not mounted on the billhook, it can be of a relatively large diameter, whereby the angle of rotation thereof is less per pass of the billhook, compared with known smaller diameter rollers, and whereby wear is more evenly spread over the longer roller surface thereby reducing undesirable wear characteristics.

The surface of the movable jaw engaged by the twine and serving as a twine guide in the knotting operation is preferably convex, the curvature of this surface being such as to pull the required length of twine from the twine holder, during the knotting operation not only to allow the knot to be formed but also permit the formed knot to be loose enough to be pulled from the billhook as opposed to being stripped therefrom by a stripping mechanism employed in some prior art knotters. To this end said convex surface of the movable jaw has about the same or even larger length than the front surface of the fixed jaw.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 4 is a view in the direction of arrow IV of FIG. 3, FIG. 5 is a view in the direction of arrow V of FIG. 3, FIG. 6 is a schematic view on drive means for the pair of knotters, FIG. 7 is a schematic section on the line VII-VII of FIG. 6, FIG. 8 is a sectional view of a component of the knotter, FIG. 9 is a view in the direction of arrow IX of FIG. 8, FIG. 10 is an enlarged view of a component of FIG. 2 which is associated with the component of FIG. 8, FIG. 11 is a view in the direction of arrow XI of FIG. 10, FIG. 12 is a plan view of another component of the knotter, FIG. 13 is a plan view of a further component of FIG. 2 shown in relation to the component of FIG. 12.

FIGS. 26 and 27 are views in the direction of arrows XXVI and XXVII of FIGS. 23 and 24, respectively, but with certain components omitted, FIG. 28 shows schematically a knot formed with a knotter, and FIG. 29 is a diagram illustrating the knotter drive.

DESCRIPTION OF THE PREFERRED EMBODIMENT

The terms "forward", "rearward", "left" and "right" when used in the following description in connection with the baler and/or components thereof are determined with reference to, and by facing in, the direction of operative travel of the baler in the field. The leading and trailing ends of the bales are determined with reference to the direction of movement thereof in the bale chamber. Since during the formation of a bale the latter is advanced in a rearward direction of the machine through the bale chamber, the leading ends of the bales face rearwardly of the machine.

Figure 1:
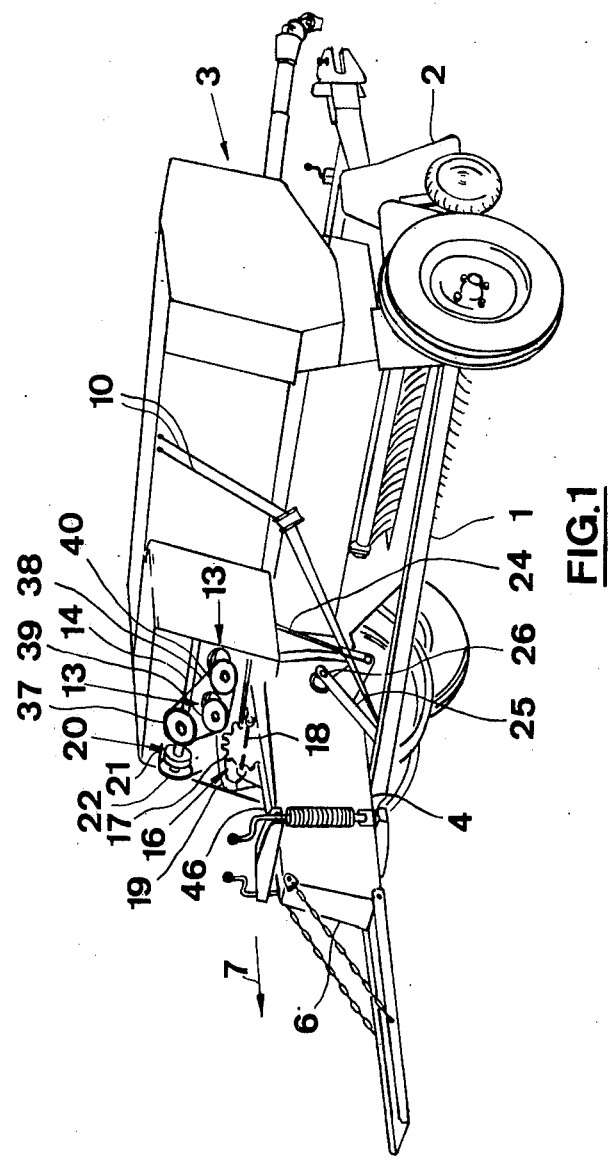
FIG. 1 is a schematic perspective view of the baler which is equipped with a pair of knotters, each being in accordance with the present invention.
Figure 2:
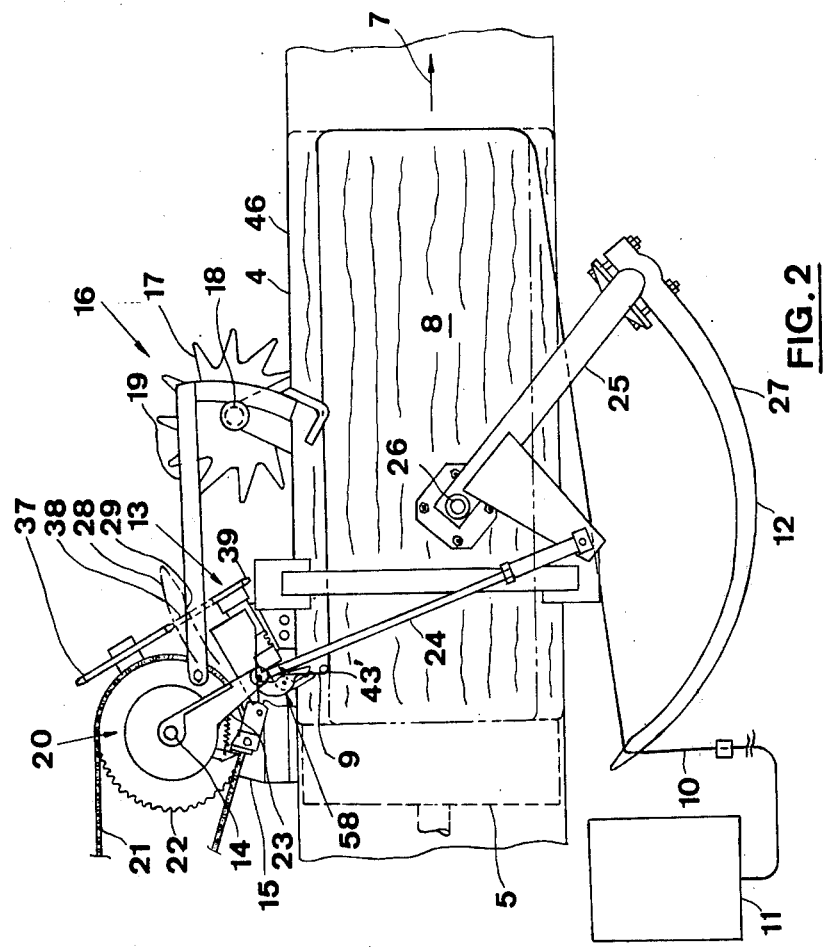
FIG. 2 is a schematic sectional view of the bale chamber and associated parts of the baler.

A typical agricultural baler is shown in FIGS. 1 and 2 and includes a wheel supported chassis 1, a pick-up mechanism 2, a feeder mechanism 3 and a bale chamber 4. As cut crop material is picked up from the ground, it is fed in successive batches or charges into the inlet of the bale chamber 4 of the batches of material are compressed into bales 8 by a reciprocating plunger 5 which also advances the bales along the chamber 4 towards an outlet 6 in the direction of arrow 7.

Figure 3:
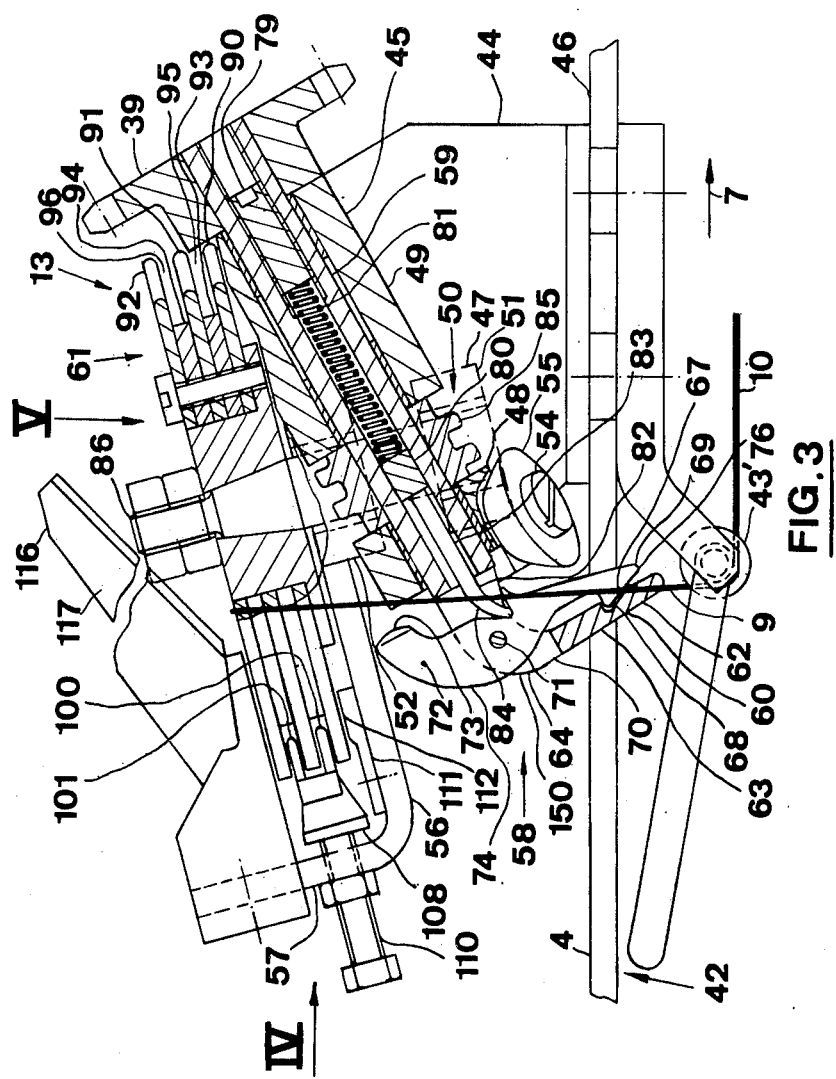
FIG. 3 is a schematic sectional view of one knotter.
Figure 14:
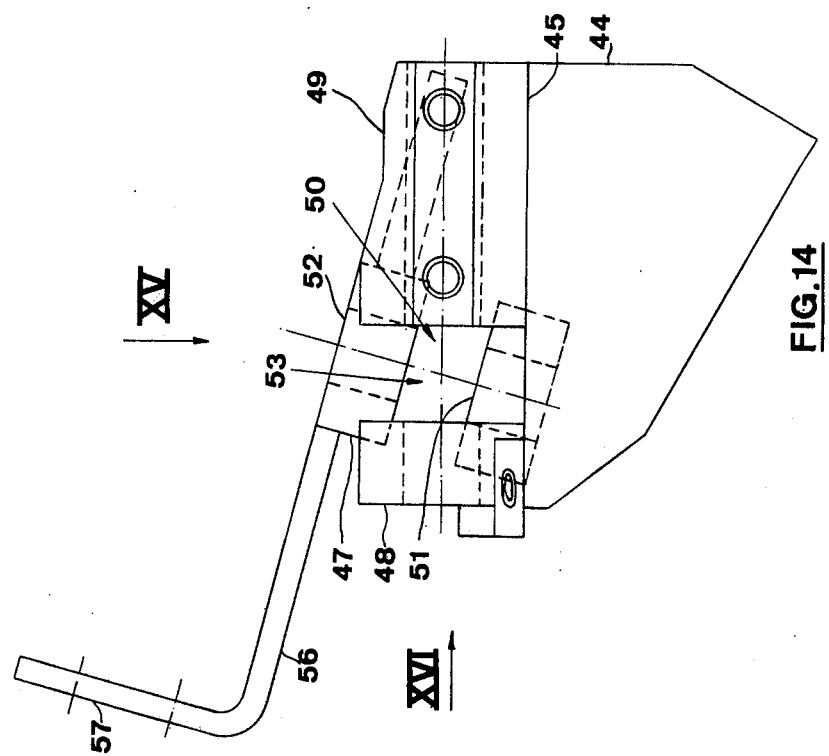
FIG. 14 is a side view of a still further component of FIG. 2.

Referring now to FIGS. 2 and 3, a primary portion or length 9 of twine or flexible material 10 extends across the baling chamber 4 in the path of the leading end of each bale 8 from a supply reel or container 11 and passes through the eye of a needle 12 with the primary portion 9 of the twine 10 being held in a knotter 13 mounted on a top wall 46 of the bale chamber 4. The baler carries a pair of identical knotters 13 and each knotter is arranged to cooperate with a needle 12 whereby, a pair of needles also has to be provided. A main drive shaft 14 (FIGS. 2, 6 and 7) is rotatably journalled in supports 15 on the upper wall 46 of the bale chamber 4 at a distance thereabove and transversely of the baling chamber 4. This main drive shaft 14 is intermittently actuated by a conventional trip mechanism 16 which includes a starwheel 17 arranged to engage the baleof hay or other material as it is being formed, whereby it is rotated about a shaft 18 as the bale 8 moves along chamber 4. The shaft 18 is operatively coupled to a trip lever 19 which itself is connected to a clutch mechanism 20 mounted on the main shaft 14. One half of the clutch mechanism 20 is driven continuously through a chain and sprocket drive transmission from an intermediate shaft on the baler, only a sprocket 22 thereof being shown in FIGS. 2 and 6. The diameter of the starwheel 17 and the transmission ratio between the shaft 18 and the trip lever 19 are such as to allow the formation of a bale of predetermined length before the trip mechanism actuates the clutch mechanism 20, whereupon the main shaft 14 is driven to initiate the tying of a knot by each knotter.

The main shaft 14 has a crank arm 23 attached thereto at its end opposite to the clutch mechanism 20, the arm 23 being connected by a pitman or link 24 to a needle frame 25 which carries the pair of needles 12 (FIGS. 1 and 2). The needle frame 25 is pivotally mounted on the bale chamber 4 by pivots 26. The bale chamber 4 has a pair of longitudinal slots in its lower wall for accommodating the needles 12 when pivoted to their full throw position.

No further elaboration is required concerning the structural detail features of the trip mechanism 16 and the needle frame and drive mechanism as these details are sufficiently well known in the art. Suffice it briefly to summarize the operation thereof. Upon actuation of the clutch mechanism 20, the main shaft 14 is driven, and the needles 12 move from their rest position 27 (indicated by full lines in FIG. 2) to their full throw position 28 (shown in phantom lines in FIG. 2) to wrap the respective twines 10 around the bottom and trailing end of the bale 8 and place the secondary portions 29 of the twines 10 in the respective knotters 13. Each twine 10 loops back over the needle 12 to the reel 11 in the full throw position 28, thereby leaving a new primary portion or length 30 of twine 10 across the path of the next bale 8 to be formed. As each needle 12 returns to its rest position 27, the ends of each primary and secondary portion 9, 29 are twisted and tied together by the knotter 13, with the secondary portion 29 being severed during the tying operation. The entire knotting or tying operation takes place between successive strokes of the baler plunger 5.

The main shaft 14 also has attached thereto a single conical gear segment 31 having teeth 32 over only about one third of its circumference. The gear teeth 32 are arranged to mesh with teeth of a conical gear 34 which is mounted on one end of a shaft 35 on the other end of which is mounted a sprocket 37. The shaft 35 is journalled in a support 36. A chain 38 engages the sprocket 37 and sprockets 39 and 40 of the respective knotters 13. As already stated, the two knotters 13 are identical and, therefore, only one will be described in further detail in relation to the associated needle 12 and other components.

Figure 15:
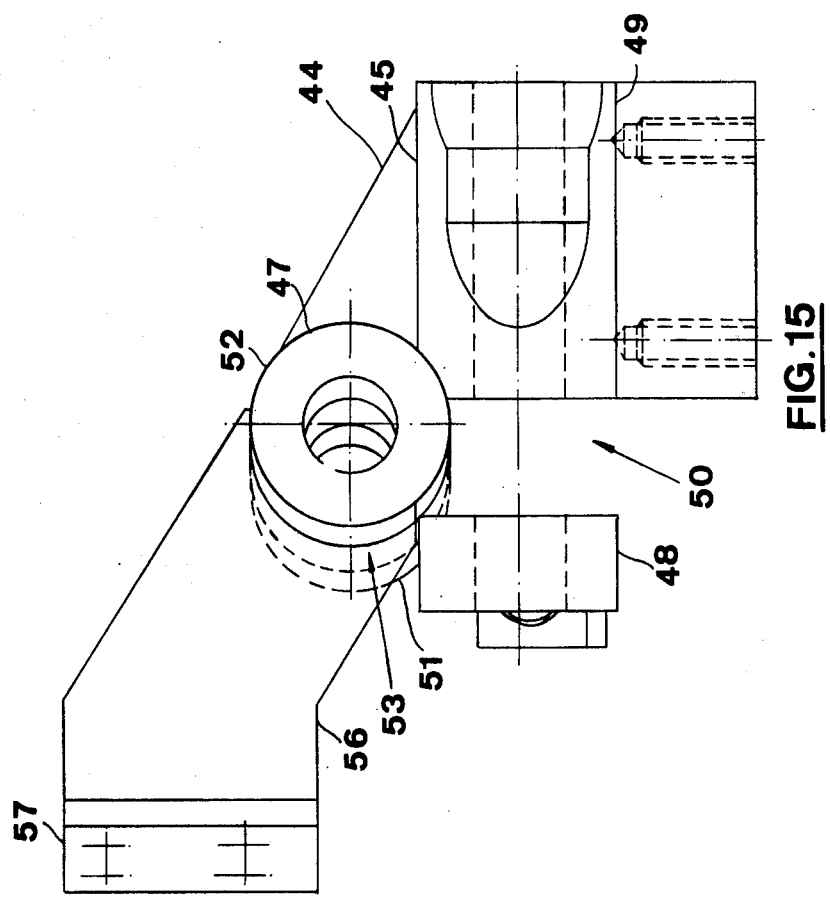
FIG. 15 is a view in the direction of arrow XV of FIG. 14.
Figure 16:
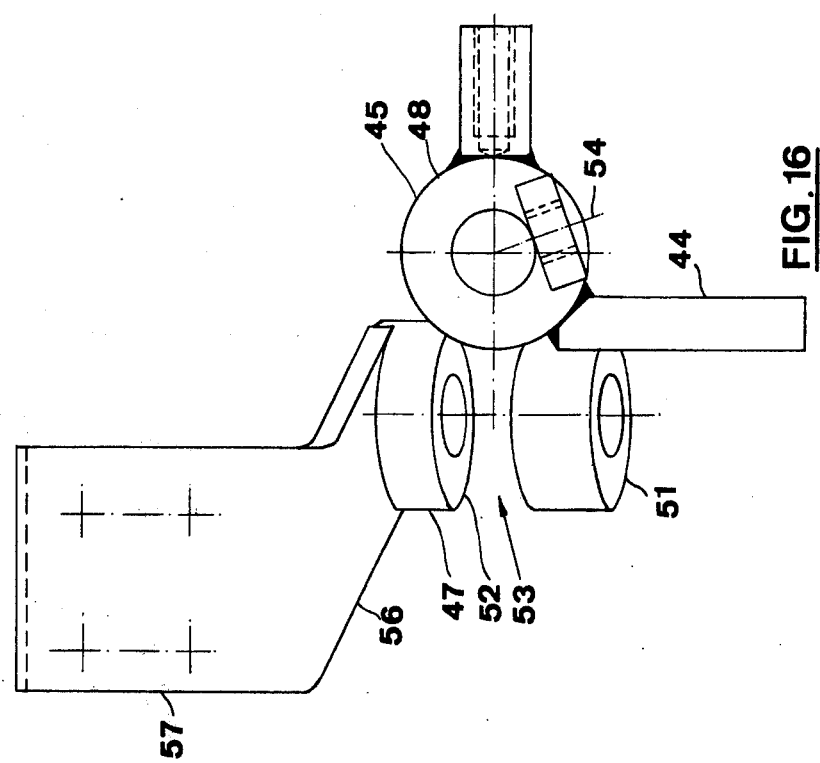
FIG. 16 is a view in the direction of arrow XVI of FIG. 14, FIGS. 17 to 25 schematically illustrate the component of FIGS. 9 and 10 in successive angular operative positions (i.e. at 0°, 90°, 180°, 270°, 360°, 450°, 540°, 630° and 720°, respectively).

The top wall 46 of the baling chamber 4 is formed with a pair of elongated apertures 42 having rear twine retaining edge 43 (FIG. 5) or a twine guide roller 43' as shown in FIG. 4. Each knotter 13 comprises a base or frame 44 mounted on the top wall 46 of the bale chamber 5 adjacent aperture 42 but slightly rearwardly of the twine retaining edge 43 or roller 43'. The base 44 is formed with a cylindrical bearing sleeve 45 which extends generally in fore-and-aft direction relative to the bale chamber 4 and inclined at an angle of about 30 degrees to the bale chamber top wall 46, with the rear end of the sleeve 45 being positioned at a higher level above the bale chamber top wall 46 than the forward end. The bearing sleeve 45 comprises a forward and a rearward section 48 and 49, respectively, spaced from each other and defining therebetween a free space 50 (FIG. 15). A further bearing sleeve 47 is provided on the base 44 at an angle of about 105 degrees with respect to the bale chamber top wall 46, the arrangement being such that the upper end of the further bearing sleeve 47 is positioned forwardly of the lower end thereof. Furthermore, the further bearing sleeve 47 is positioned to one side of the first bearing sleeve 45 and also comprises two spaced portions 51 and 52 defining therebetween a free space 53 (FIG. 15). The free space 50 interconnects with the space 53 and the spaces accommodate transmission means to be described.

The lower section 48 of bearing sleeve 45 supports a downwardly projecting spindle 54 which rotatably supports a part spherical roller cam 55 (FIGS. 3, 4 and 5) at a fixed angle relative to the rotation of the billhook 58. A further support member 56 extends forwardly from the upper portion 52 of the further bearing sleeve 47 and comprises an upturned forward edge 57.

Each knotter comprises an actual knotter mechanism or billhook, indicated generally at 58, with which is associated a hollow billhook or twister shaft 59 rotatably journalled in the sleeve sections 48, 49 of the bearing sleeve 45, the billhook 58 being inclined to the longitudinal axis of the twister shaft. The twister shaft 59 supports at one end the associated driving sprocket 39 or 40. The billhook 58 comprises a fixed jaw 60 inclined at about 90 degrees to the end of the twister shaft 59 opposite to the sprocket 39 or 40 adjacent, on the one hand, the aperture 42 in the top wall 46 of the bale chamber 4 and, one the other hand, a twine holder of the knotter which is generally indicated at 61. In the rest position the billhook 58 projects downwardly towards and partially through the aperture 42 in the bale chamber top wall 46, and the axis of the twister shaft 59 is positioned above and offset relative to the center line of the aperture 42. The fixed jaw 60 has an elongated body 63 which is wider than it is thick as seen from FIGS. 4 and 8. The transition between the shaft 59 and the jaw body 63 comprises smoothly curved and rounded surfaces 64, thus avoiding any sharp edges which might sever the twine 10. The fixed jaw 60 has a bent tip portion 65 which, in the rest position seen in FIG. 4, extends transversely of the bale chamber 4 and the aperture 42 in the top wall 46 thereof. The transition between the body 63 and the tip portion 65 also comprises smoothly curved and rounded surfaces 66. At the side facing the twister shaft 59, and adjacent the tip portion 65, the fixed jaw comprises a recess or notch 67 arranged for receiving a crochet hook 68 of a movable jaw 69 of the billhook 58. At the junction of the fixed jaw 60 and the twister shaft 59, the fixed jaw is provided with an elongated slot 70 through which the movable jaw 69 extends and in which it is pivotally mounted by a pivot pin 71. The movable jaw 69 has at one end a heel portion 72 which acts as a cam follower with respect to the roller cam 55 as the twister shaft 59 is rotated. The heel portion 72 is generally rectangular as seen in FIG. 11 with its operative, cam-follower face 73 being convex as seen in FIG. 10. The heel portion 72 is smoothly integrated with the remainder of the movable jaw 69.

The movable jaw 69 further comprises a curved (convex) portion 74 which serves as a twine guiding surface and which extends from the heel portion 72 to approximately mid way along the jaw, i.e. to the point where the movable jaw 69 extends through the slot 70 in the fixed jaw 60. On the side facing the fixed jaw 60 the movable jaw 69 has a transition surface 152 between the curved portion 74 and the crochet hook 68. The crochet hook 68 on the movable jaw 69 and the notch or recess 67 in the fixed jaw 60 cooperate to grip, and hence maintain, the twine when the latter is positioned between the open jaws and the movable jaw 69 has been moved to its closed position. The movable jaw 69 has a tip portion 76 extending in a similar manner to the tip portion 65 of the fixed jaw 60. Furthermore, the central portion of the jaw 69 includes, on the side opposite to the fixed jaw 60, a shoulder 77 for preventing the entrapment of a section of twine between the movable jaw 69 and the slot 70 through a central portion of the fixed jaw 60 which would interfere with the proper operation of the billhook 58 in tying a knot, or prevent the release of a tied knot from the billhook.

The movable jaw 69 further also comprises a recess or notch 78 in the side opposite to the fixed jaw 60 at a location slightly offset relative to the pivot 71. A mechanism for spring loading the movable jaw 69 is provided inside the hollow twister shaft 59, whereby the jaw is urged to the closed position. Referring to FIG. 3, the mechanism comprises an adjustable screw-threaded stop member 79, a compression spring 81 abutting at one end the adjustable stop member 79 and at the other end an abutment member 80 engaging a retainer pin 82. The retainer pin 82 comprises an elongate stem 83 extending coaxially with the twister shaft 59 and an angled end 84 adapted for engagement with the notch or recess 78 in the movable jaw 69.

The twister shaft 59 carries intermediate the sleeve sections 48, 49 of the bearing sleeve 45 a helical gear 85 with a single spiral tooth for driving the twine holder 61. The twine holder 61 comprises a generally upright, though slightly forwardly inclined, shaft 86 which is rotatably mounted in the portions 51, 52 of the second bearing sleeve 47. A helical gear 87 secured to the twine holder shaft 86 at a location inbetween the bearing sleeve portions 51, 52 is arranged to mesh with the helical gear 85 for driving the twine holder 61. The transmission ratio between the twister shaft 59 and the twine holder shaft 86 is 12/1 and the various transmissions are arranged so that the twister shaft 59 is rotated in the direction 88, whilst the twine holder 61 is rotated in the direction 89 (FIG. 4).

Referring to FIGS. 3, 4 and 5, the twine holder 61 itself comprises three generally circular flanges or discs 90, 91 and 92 which are spaced from each other by respective spacers 93 and 94 which define, with the flanges, respective slots or grooves 95 and 96. The flanges 90, 91 and 92 are generally circular in shape and of the same size and each flange has at its periphery six equispaced notches 97. The notches 97 are generally rectangular in shape and of a depth which is substantially smaller than the difference between the radius of the flanges 90, 91 and 92 and the radius of the spacers 93 and 94. Thus the grooves 95 and 96 still have an effective depth even at the location of the notches 97. The leading and trailing edges 98 and 107, with respect to the direction of rotation 89, of each notch 97 are directed generally radially of the twine flanges 90, 91 and 92 with the outer end of the leading edge 98 cut away to allow the twine readily to enter the notch. Adjacent notches 97 in the three flanges 90, 91 and 92 are slightly offset relative to each other so that the notches 97 in one flange are slightly in advance (again with respect to the direction of rotation 89) of the corresponding notches 97 in the flange immediately above. Thus associated notches 97 in the flanges 90, 91 and 92 define grooves 158A to 158D (FIG. 5) which are inclined rearwardly, with respect to the direction of rotation 89, at an angle of about 60° relative to the planes of the flanges. All edges of the twine holder flanges 90, 91 and 92 are rounded so as to avoid inadvertent cutting of the twine during operation.

The further support member 56 is provided with a pivot 99 at one side of the twine holder 61 for pivotally mounting a pair of twine retaining fingers 100 and 101 one of which is shown in FIGS. 12 and 13. The fingers 100 and 101 extend from the pivot 99 in a transverse direction across the twine holder 61 and extend in part between the flanges 90, 91 and 91, 92, respectively. Each finger 100 and 101 has a curved edge 102 opposite the pivot which edge acts as a twine guide, assisting in the positioning of the secondary portion 29 of the twine in the groove 158A as seen in FIG. 5. The edge 102 part defines a generally hooked end 103 of the finger which, at least in the upper finger 101 shown in FIGS. 12 and 13, has a straight edge 104 which also acts as a twine guide. The edges of the fingers 100 and 101 facing towards the twine holder 61 and extending between the flanges 90, 91; 91, 92 each comprises two curved sections 105 extending a short distance around the respective spacers 93 and 94 and separated by a curved section 106 of smaller radius than the sections 105. The fingers 100 and 101 are resiliently urged by a leaf spring 108 to their positions between the flanges 90, 91 and 91, 92 respectively. The leaf spring 108 is secured at one end adjacent the pivot 99 to the upturned edge 57 of the supporting member 56 and extends in the direction of the fingers and contacts the same at portions 109 of the edges opposite to those located between the flanges. An adjustable screw 110, mounted on the upturned edge 57, contacts leaf spring 108 intermediate its ends to provide adjustment of the pressure exerted by the spring on the fingers 100 and 101.

Projecting from the further supporting member 56 in a rearward direction and closely adjacent the underside of the lower flange 90 is a knife blade 111 having a cutting edge 112 facing in a direction opposite to the direction of rotation 89 of the twine holder 61. The knife blade 111 is adjustably and releasable mounted to facilitate adjustment and either sharpening or replacement should this become necessary.

Supported on the left hand side of the support base 44 (when seen in the direction of operative travel of the baler) and projecting towards the twine holder 61 is a first stationary twine guide 113 (FIG. 4) having a guide edge 114 extending from a forward and offset location relative to the twine holder 61 in a rearward direction and then inclining towards the twine holder 61. The guide edge 114 extends into the groove 95 between the flanges 90 and 91. Twine holder cleaners 115 are provided in the grooves 95 and 96 at the rear end of the twine holder 61 for clearing twine and other debris out of the grooves.

Projecting from the upturned edge 57 on the further supporting member 56 in a rearward direction and partially above the twine holder 61 is a second stationary twine guide 116. This second twine guide 116 comprises a guide surface 117 operable to guide twine towards the left hand side of the twine holder 61.

Having described the components of the knotter constructed in accordance with the invention, the operation thereof will now be described in greater detail with reference to the FIGS. 2 to 27. The sequence of operation of the mechanism will be described with reference to FIG. 29 illustrating the various characterizing angular positions of the main shaft 14.

During operation the baler is moved across a field and crop material, such as hay, to be baled is picked up from the ground with the pick-up mechanism 2 and is delivered thereby to the feeder mechanism 3 which in turn feeds the crop material in successive batches or charges into the bale chamber 4 in time sequence with the reciprocating baler plunger 5. The baler plunger 5 compresses the crop material into a bale 8 and at the same time gradually advances the bale towards the outlet 6 of the baling chamber 4 in the direction of arrow 7. As long as the clutch mechanism 20 is not actuated, all components of the knotters 13 are in their rest positions. This means the needles 12 are in their lowermost dwell position as shown in full lines in FIG. 2 whilst the billhooks 58 project downwardly as seen in FIG. 4. As already mentioned, a primary portion 9 of twine 10 extends from a supply reel 11 across the bale chamber 4 in the path of the leading end of the bale 8 being formed and passes through the eye of the needle 12, with the free end of the primary portion being supported in the twine holder 61 of the associated knotter 13, bearing in mind that two knotters are employed, whereby each bale 8 is bound by two pieces of twine. The free end of the primary portion 9 of the twine 10 is received in a groove 158B of the twine holder 61 and passes across the top of the twine holder 61 and down into the next groove 158A (arising from the knotting operation in relation to the previous bale) and is firmly held in position by the retainer fingers 100 and 101 (more especially by the edge portions 106 in cooperation with the respective flanges 90, 91 and 92).

As a bale 8 is being formed and moved along the bale chamber 4, the starwheel 17 is rotated thereby and as the bale reaches a predetermined length, the metering wheel 17 actuates the clutch mechanism 20, whereupon the main shaft 14 is rotated through 360° by the chain and sprocket drive mechanism. During the first 180° of rotation of the shaft 14 (referenced 118 in FIG. 29) the crank arm 23, the pitman 24 and the needle frame 25 are pivoted, whereby the needles 12 move from their lowermost rest position (full lines in FIG. 2), when the main shaft 14 is at point 119 in FIG. 29, to their highest, full throw, positions (phantom lines in FIG. 2) when the main shaft 14 is at 120. Simultaneously, as is known in the art, the baler plunger 5 is moving towards its extreme straw compressing position. The needles 12 move upwardly through the baling chamber 4 and through slots (not shown) in the face of the bale plunger 5, whereby the plunger holds the crop material to be baled away from the needles 12, thus enabling a smooth and unobstructed passage of the needles 12 through the bale chamber 4 and preventing bending and/or breakage of the needles 12. During the next 180° of rotation 121 of the main shaft 14, the needles 12 are retracted and return to their rest or dwell positions at position 119 of the main shaft 14. At the same time, the plunger 5 is retracted. During the initial movement 122 over 120° of the main shaft 14, the teeth 32 of the gear segment 31 are not in mesh with the teeth of the conical gear 34, whereby the actual knotting mechanism is not operated.

During the initial movement 122 of the shaft 14, each needle 12 carries the end of the secondary twine portion 29 of the twine 10 from the position shown in full lines in FIG. 2 around the bottom and trailing end of the bale 8 to the position shown in phantom lines in FIG. 2. At the position 123 of the main shaft 14, the tip of each needle 12 projects through the aperture 42 in the bale chamber top wall 46 and at a location generally forwardly of the associated knotter 13 and slightly offset to the left relative to the billhook 58 thereof and relative to the center of the twine holder 61. At that moment, the needle 12 places the end of the secondary twine portion 29 in the groove 158A positioned above and slightly rearwardly of the billhook 58 and adjacent the primary end portion 9 already positioned therein. At that moment, the secondary twine portion 29 is inclined generally rearwardly in an upward direction at an angle substantially equal to the angle of inclination of the groove 158A positioned at the apex of the V defined by the guide members 113 and 116. Hence the twine portion 29 is readily located in the groove 158A The end of the secondary twine portion 29 is held against the trailing edge 107 of the notches 97 whilst the end of the primary portion is held against the leading edge 98 thereof. The guide edge 114 of the stationary twine guide 113, the guide surface 117 of the second twine guide 116, and the extreme guide edges 102 of the twine retainer fingers 100 and 101, together with the rounded outer edges of the twine holder flanges 90, 91 and 92, all cooperate in guiding the end of the secondary twine portion 29 into the appropriate position in the groove 158A.

The gear segment 31 meshes with the conical gear 34 at the position 123 of the main shaft 14, whereby the twister shaft 59 and the twine holder 61 start rotating in the directions 88 and 89, respectively. The transmission ratios are such that for 60° rotation of the main shaft 14, the twister shaft 59 is rotated through 360° and the twine holder 61 is rotated through only 30°.

As the twine holder 61 is rotated over said 30° in the direction 89, the ends of the primary and secondary twin portions 9 and 29 held in the groove 158A are caused to move in the same direction and towards the twine retainer fingers 100 and 101. The guide edges 104 on the twine retainer fingers 100 and 101 wedge the twine portions between said fingers and the flanges 90, 91 and 92. After no more than 15° of rotation of the twine holder 61, the ends of the twine portions 9 and 29 are strongly caught and held between the fingers 100 and 101 and said flanges 90, 91 and 92 and only can slide therebetween under a substantial tensile load. This firm grasp on the two portions of twine is held over about 30° of rotation of the twine holder 61, i.e. until the main shaft 14 has reached the position 125. Thereafter the ends of the twine portions 9 and 29 are moved between the sections 106 of the retainer fingers 100 and 101 and the flanges 90, 91 and 92 which increases the area of contact between the various components and the twine so that the grasp on these ends is further increased to the extent that the ends can no longer slide between the components in question. The free end of the primary twine portion 9, which initially was held between the flanges 90, 91 and 92 and the sections 106 on the twine fingers 100 and 101, moves past the sections 106 substantially at the same moment as the ends of the twine portions 9 and 29 move between the flanges 90, 91 and 92 and the twine retainer fingers 100 and 101 at the location of the hooked ends 103 of the fingers.

As the twine holder 61 is rotated over the first 30° of its movement, i.e. when the main shaft 14 is rotated from the position 123 to the position 120, the twister shaft 59 is rotated over a first full cycle of 360°. The primary twine portion 9 extends, as is shown in FIG. 3, between the groove 158A and the twine retaining edge 43 or roller 43' of the aperture 42 in the bale chamber top wall 46 when the main shaft 14 is in the position 123. At the same time, the secondary twine portion 29 extends between the same groove 158A and a further forwardly positioned lower point, which normally is defined by the trailing end of the bale of crop material in the bale chamber 4. Thus both twine portions 9 and 29 normally have a slightly different position when the main shaft is in the position 123.

During the first 90° rotation of the twister shaft 59, the billhook 58 engages both twine portions 9 and 29 from below and from the right (FIG. 17) and causes them to slide from the tip 65 of the fixed jaw 60 towards the base thereof over the forward surface 151 (FIG. 18), thus the twine portions are urged to move in front of the billhook 58. During the next 90° rotation of the twister shaft 59 (90°-180° movement), the twine portions 9 and 29 slide further towards and arrive at, the base or heel of the billhook 58 so that said strands are now positioned rearwardly of the billhook 58 and engage the rear edge 153 of the movable jaw 69 (FIG. 19). The twine portions 9 and 29 are maintained behind the billhook 58 during its movement from the 90° to the 180° by the notches 97 forming the groove 158A in which the portions are located which are still positioned rearwardly of the billhook, thus holding the twine portions 9 and 29 in a substantially rearwardly and upwardly inclined position and at an angle relative to the billhook 58. The heel portion 72 of the movable jaw 69 engages the roller cam 55 during the latter part of the rotational movement of the twister shaft 59 from the 90° to 180° position. This causes the movable jaw 69 to open against the resilient force of the spring 81 but this does not result in the ends of the twine portions 9 and 29 being caught between the jaws as is usual at this stage in conventional knotters. This is because the upper parts of the twine portions 9 and 29 are positioned rearwardly of the opened jaw 69 as already explained. The opening of the jaws 60, 69 at this stage does serve a useful purpose, however, in that the movable jaw 69 positively urges the upper parts of said twine portions 9 and 29 into the relevant groove 158 which is now positioned adjacent the billhook 58 and towards the base thereof. This is especially so during the continued movement of the billhook 58 beyond the 180° position. Thus, during the first cycle the billhook 58 positively assists in properly positioning the twine portions 9 and 29 relative to the twine holder 61 so that they can be held by the latter in the desired manner.

Continued rotation of the twister shaft 59 from the 180° position to the 270° causes both twine portions 9 and 29 to slide over the rear edge 153 of the movable jaw 69 in the direction of the pivot pin 71 and the shoulder 77 (FIG. 20). Both twine portions 9 and 29 are now held behind the billhook 58 at the right-hand side thereof. Simultaneously, the movable jaw 69 is again closed under the resilient pressure of spring 81 as soon as the heel portion 72 disengages the roller cam 55. Continued rotation of the twister shaft 59 from the 270° position to the 360° causes the twine portions 9 and 29 further to slide along the billhook 58 so as to engage the shoulder 77 of te movable jaw 69 (FIG. 21). Thus on completion of the first cycle (360°) of the billhook 58 both twine portions 9 and 29 extend from above the billhook along the right-hand side of the base thereof, behind the rear edge 153 of the movable jaw 69, and over the leading edge 159 of the fixed jaw 60. The lower strand portions project in a forwardly inclined direction over the respective tip portions 65 and 96 of the jaws 60 and 69. This enables the billhook 58, upon continued rotation beyond the 360° position (i.e. during its second cycle) to catch again both twine portions 9 and 29 from below and from the rear thereof as seen in FIG. 21.

The billhook 58 is thus operative during its first full cycle of 360° (movement of the main shaft 14 from the position 123 to the position 120) to bring the twine portions 9 and 29 closely parallel and adjacent to each other so that they are in the best possible condition for a knot to be tied during the next cycle of the billhook 58. At the end of the first cycle of the billhook 58, each needle 12 has reached its full throw position and is at te point of returning to its fully retracted or dwell position. The needles 12 reach their dwell positions when the main shaft 14 returns to its position 119. During this movement, each needle 12 carries a further portion of twine 30 down the trailing end of the formed bale and this twine portion 30 becomes the primary twine portion for the next bale to be formed.

When the main shaft 14 has reached the position 126, the gear segment 31 passes beyond the conical gear 34, whereby drive to the knotters 13 is interrupted. Thus, further rotation of the main shaft 14 from the position 126 to the position 119 merely completes the retraction of the needles 12 to their dwell positions.

As the main shaft 14 moves from the position 120 to the position 125 the twister shaft 59 is rotated over the first 180° of its second cycle (the actual knot-tying cycle). During the first 90° of this cycle the tips 65 and 76 of the billhook jaws hook behind and below the twine portions 9 and 29 from the right hand side and the latter begin to slide over the surface 151 of the fixed jaw 60 (FIG. 22). Further rotation of the billhook 58 from the 90° position to the 180°position of the second cycle causes the lower parts of the twine portions 9 and 29 to slide further over the surface 151 of the fixed jaw 60 towards the base thereof (FIG. 23). Simultaneously, the heel 72 of the movable jaw 69 hooks behind the upper parts of the twine portions 9 and 29 thus causing them to slide in the direction of the base of the billhook 58 over the curved section 74 of the movable jaw 69. Continued rotation of the twister shaft 59 towards the 180° position results in a loop being formed around the billhook 58 (FIG. 23). As the loop is being completed, the heel 72 contacts the roller cam 55 for the second time which opens the jaws 60 and 69 and the twine portions 9 and 29 are now in a position relative to the billhook 58 in which the can enter the open jaws as seen in FIG. 26. This is because the groove 158A holding the twine portions has now reached a position closer to the billhook and slightly to the right thereof. At the same time, the groove 158A reaches a position in which the end of the primary twine portion 9 previously held thereby is released.

As the heel 72 moves off the roller cam 55 during movement of the twister shaft 59 from the 180° position to the 270° position, the jaw 69 is closed due to the action of the spring 81, whereupon the twine portions 9 and 29 are firmly clamped in the billhook jaws 60 and 69. (FIGS. 24 and 27).

During the loop-forming part of th cycle a substantial tensile force is exerted on the twine portions 9 and 29 causing them gradually to slip a limit amount between the flanges 90, 91, and 92 and the associated twine retaiing fingers 100 and 101. This is necessary in order to provide a certain length of twine with which to form the knot, the appropriate length being determined by the curvature of the surface 74 of the movable jaw 69 and being sufficient not only to enable the knot to be tied but also for the knot to be loose enough (but not too loose) for it to be pulled from the billhook. This length of twine is substantially longer than on conventional knotters.

During the movement of the main shaft 14 from the position 125 to the position 126, the billhook 58 is rotated from its 180° position to its 360° position of the second cycle during which movement the loop of twine slides towards the tip of the billhook 58 with the ends of the twine portions 9 and 29 still clamped between the jaws 69 and 69. Also, the twine holder 61 is rotated further, thereby moving the ends of the twine portions 9 and 29 to the sections 106 of the retainer fingers 100 and 101 so that, as already explained, grasp on the twine portions is increased substantially to the extent that the ends are no longer allowed to slide in between the various components even under an increased tensile load. As the twine holder 61 moves on to its next following rest position (which is reached with the main shaft 14 in position 126), the groove 158A holding the twine portions 9 and 29 moves past the fixed knife blade 111, whereby both portions of twine are severed, leaving the formed bale 8 independent as such although the looped ends of the twine portions are still retained on the billhook 58 (FIG. 25). The cutting of the primary twine portion 9 gives rise to a short piece of waste twine and if this does not fall from between the flanges 90, 91 and 92 during the formation of subsequent bales, the twine disc cleaners 115 will remove it. A clean cut of the twine portions 9 and 29 is obtained as at the moment of cutting, these portions are firmly held in the twine holder 61 by the finger sections 106 as described above.

The billhook 58 thus moves to its rest position in timed sequence with the tail ends of the twine portions 9 and 29 being cut. In this position, the jaws 60 and 69 extend generally downwardly and rearwardly towards and adjacent, or even partially through, the aperture 42 in the top wall 46 of the bale chamber 4. As stated, the loop just formed is still retained on the billhook 58 with the severed tail ends still clamped therebetweenn. The tail ends are more-or-less firmly clamped between the jaws 60 and 69 under the action of the spring 81, with the crochet hook 68 of the movable jaw 69 nesting in the notch 67 of the fixed jaw 60. The subsequent strokes of the bale plunger 5 cause the wrapped bale 8 to move further rearwardly along the bale chamber 4, thereby also causing the loop to be pulled off the billhook 58 over the severed tail ends of the twine portions 9 and 29 and to tighten the loop around the tail ends. At this moment the knot is actually completed. The tail ends of the twine portions 9 and 29 are finally also released under the increasing tensile load exerted thereon by the rearward movement of the bale in the bale chamber 4. Depending on the shape, dimensions and adjustments of the billhook 58, as is generally known in the art, the knot so formed will be an overhand knot or bow knot the latter being illustrated in FIG. 28.

As the main shaft 14 approaches the position 126, the tail end 30 of the primary twine portion for the next bale, which is held in the next following groove 158 and which extends over the top of the twine holder 61, engages the sections 106 of the fingers 100 and 101, so that when a tensile load is exerted on the twine during the formation of the following bale, said tail end is firmly held and does not slip.

At the same time as the twine holder 61 reaches its rest position, the next following groove 158F is brought in position at the apex of the V formed by the twine guides 113 and 116 for receiving the primary twine portion 30 for the next bale which portion is held in the groove 158A and extends over the uppermost flange 92, down through the groove 158F to the needle 12 and then to the reel 11, the guide surface 117 of the twine guide 116 and the guide edge 114 of the twine guide 113 assisting in the positioning of the twine portion 30.

In typical prior art knotters a twine finger is required to place the twine in the correct position to engage the billhook and a stripping finger or the like is required to pull the cut twine ends off the billhook jaws. With the present invention, however, the twine finger and twine stripper and drive means therefor are not necessary due to the particular arrangement of the twine holder relative to the billhook and due to the fact that the billhook has a twine "assembling" cycle (the first cycle) in addition to a knotting cycle. Furthermore, the normal movable knife blade for cutting the twine after a knot has been tied, has been replaced by a simple stationary knife with the relative movement required for the cutting operation being provided by the rotation of the twine holder. This further simplifies the structure.

It will be seen that the cam roller 55 is relatively large and as it is contacted by the heel 73 of the movable jaw 69 over a small angular part of each cycle of movement of the billhook 58, the rotational movement of the roller is also small whereby wear is equally spread over the roller surface, thus minimizing wear. The location of the roller 55 relative to the billhook 58 is such that it does not present a trap for the twine portions 9 and 29 as it would if it were positioned on the heel of the movable jaw 69 as in known knotters. FIGS. 17 and 21 show that the twine portions 9 and 29 are substantially parallel to the billhook jaws 60, 69 at the start of each cycle of the billhook. FIG. 23 shows that the loop formed in the twine portions 9 and 29 is at a right angle to the position of these portions at the start of the cycle, whereby the twine portions have to move over a relatively large distance between these positions and the length of the curved section 74 of the movable jaw reflects this, the length being three to four times greater than known billhooks.

From the foregoing it will be understood by those skilled in the art that a knotter according to the invention is of simple design, whereby it is simple to manufacture, assemble and adjust. The structure is very reliable and requires only a minimum of attention once it has left the factory. Field adjustments, if required at all, are readily accomplished and can be made by the average operator, whereby expensive harvesting delays are avoided. Variations in twine and the use of different types of twine only require minimum adjustments, if any at all. The number of oscillating and complicated parts and of complicated drive means such as cams and cam followers, has been reduced to a minimum and most of the moving parts have rotational movement only. The remaining oscillatory components are small in size and have only small displacements. For this and other reasons, the inertia forces are less critical and hence the speed of operation of the knotter, and hence of the baler, can be increased substantially. Increased knotter speed does not adversely affect the quality of knot tied by the knotter because, as described, an entire cycle of operation is devoted to establishing the proper position of the portions of twine to be tied and a further entire cycle is devoted to tying the actual knot. In most known balers the maximum baling speed is 90 strokes per minute of the bale plunger but upwards of 130 strokes per minute can be accommodated by a knotter in accordance with the present invention. Within reason, the plunger speed of operation is unlimited and the only restraint is that imposed by the knotter which normally only has one cycle of 360° in which to perform the knotting operation and which is completed in between two subsequent plunger strokes so that the speed of the moving parts is high so that inertia and other factors become significant and detract from the consistent tying of acceptable knots.

Conventional knotters normally have a main drive arrangement for each knotter installed on the baler. As a baler usually employs two knotters, then two main drive means are required. However, two or more knotters according to the present invention can be driven by a simple, single main drive arrangement.

Due to the simple design and the reduced number of moving parts, it is possible significantly to reduce the number of greasing nipples per knotter. Conventional knotters normally have six or seven greasing nipples but a knotter according to the present invention only requires one greasing nipple for the twine holder shaft and another for the twister shaft. Also due to the design of the knotter the operation of the knotting mechanism will be affected to a lesser extent, if at all, by the vibrations of the baler, the tension in the twine, the jarring of the baler as it moves through a field, variation in the crop condition such as tough or resilient crops causing the baler twine to jump about, and moisture, dirt, crop debris and the like all subjecting the components to abrasion.

The angle of the twister shaft relative to the bale chamber is advantageous for the reason that the billhook is positioned extremely close to the bale. Thus a shorter loop of twine around the bale and thus also a higher bale density is obtained in that the bale is bound tighter and does not expand to take up slack in the twine band. The chosen inclination of the twister shaft, and also of the billhook, relative to the bale chamber is also advantageous in that the load on the twine as the knot is pulled off the billhook is reduced.

Finally, it will also be understood by those skilled in the art that the cost of a knotter according to the invention and the cost of field delays and servicing are reduced substantially in comparison with the costs of a conventional knotter.

While a specific embodiment of the invention has been illustrated and described it will be apparent to those skilled in the art that various alterations and modifications in the construction and arrangement of components can be made. For example, the angles quoted in the above description, especially those illustrated in FIG. 29, as well as the various transmission ratios, may be altered. Furthermore, it could prove advantageous to have the rest position of the billhook at a small inclination to the right relative to the vertical, so that there will be less tendency for the loop on the billhook to stay on the tips of the billhook jaws when it should slide thereoff.

Having thus described the invention, what is claimed is:

1. In a crop baling machine having an elongate bale case, a pickup and infeed mechanism for delivering crop material into said bale case, a packing mechanism at least partially within said bale case for compressing the crop material therein into a compact mass and forcing it through said bale case, a twine dispensing mechanism including at least one twine carrying needle movable through said bale case, and a knot tying mechanism on said bale case for cyclically receiving twine from said needle and tying a knot in primary and secondary portions thereof to provide separate discrete packages of crop material, said knot tying mechanism including a support frame, means mounted on said frame for holding the primary and secondary portions of the twine in a substantially side-by-side relationship extending along a predetermined path, said means for holding including a rotatable means, said path movable with the rotation of said rotatable means between at least first and second positions, a billhook including an elongate shaft rotatably mounted on said frame adjacent said twine holding means, an actuation means also mounted on said frame adjacent said billhook to open and close same at selected locations along its rotary path, and means for rotating said rotatable means and said billhook in timed relation, the improvement wherein:

said actuation comprises a rotatable cam mounted on a fixed spindle, said spindle being fixed relative to the rotation of said billhook; and said billhook includes a fixed jaw and a movable jaw pivotably mounted on said fixed jaw, said movable jaw further including a cam follower for contacting said rotatable cam and opening and closing said billhook in response to the surface variations of said cam.

2. The crop baling machine of claim 1, wherein:

said actuation means comprises a roller with an axis of rotation substantially perpendicular to the longitudinal axis of said elongate shaft.

3. The crop baling machine of claim 2, wherein:

said cam follower comprises a heel portion integrally formed with said movable jaw to engage said roller during part of the rotary movement of said billhook to open and close same.

4. The crop baling machine of claim 3, wherein:

said roller has at least a partially spherical working surface.

* * * * *